United States Patent [19]

Michalko

[11] 3,919,117

[45] Nov. 11, 1975

[54] METHOD OF PREPARING ALUMINA SPHERES

[75] Inventor: Edward Michalko, Chicago, Ill.

[73] Assignee: Universal Oil Products Company, Des Plaines, Ill.

[22] Filed: Mar. 18, 1974

[21] Appl. No.: 452,482

[52] U.S. Cl. .............. 252/448; 252/442; 252/463
[51] Int. Cl.² ............................................ B01J 37/00
[58] Field of Search ................. 252/448, 442, 463

[56] References Cited
UNITED STATES PATENTS 2,544,869  3/1951  Webb et al. ..................... 252/448
2,620,314  12/1952  Hoekstra ......................... 252/448

*Primary Examiner*—Patrick P. Garvin
*Attorney, Agent, or Firm*—James R. Hoatson, Jr.; Robert W. Welch; William H. Page, II

[57] ABSTRACT

A method of preparing alumina spheres of improved halogen capacity. Alumina spheres, prepared by the oil drop method, are aged in an aqueous ammonium carbonate solution, and dried and calcined to increase the halogen capacity thereof.

6 Claims, No Drawings

METHOD OF PREPARING ALUMINA SPHERES

Alumina, alone or in combination with one or more other refractory inorganic oxides, is widely employed as a catalyst, or as a catalyst base, support or carrier material. Frequently, the activity of an alumina-supported hydrocarbon conversion catalyst is dependent to a large extent on the acidic character of the catalyst. Thus, in the manufacture of an alumina-supported hydrocarbon conversion catalyst, it is common practice to include a halogen component to provide the desired acidic function or enhance the acidic character of the catalyst. For example, in the manufacture of an alumina-supported hydrocarbon reforming catalyst, halogen is typically combined with the alumina support or carrier material in amounts ranging from 0.1 to about 1.5 wt. % thereof, while in the manufacture of a hydrocracking or hydrocarbon isomerization catalyst it is generally preferred to utilize a larger quantity — up to about 10 wt. %.

The method of this invention is particularly concerned with the manufacture of spheroidal alumina particles by the oil drop method substantially as described in U.S. Pat. No. 2,620,314. Briefly, the oil drop method comprises dispersing an alumina sol, such as results from digesting aluminum in hydrochloric acid under controlled conditions, as droplets in a hot oil bath whereby gelation occurs with the formation of sheroidal gel particles. In this type of operation, the alumina is set chemically utilizing ammonia as a neutralizing or setting agent. Usually, the ammonia is furnished by an ammonia precursor such as hexamethylenetetramine which is included in the sol. Only a fraction of the ammonia precursor is hydrolyzed or decomposed to ammonia in the relatively brief period during which initial gelation occurs with the formation of firm spheroidal particles. During the subsequent aging process, usually in the hot forming oil, the residual ammonia precursor retained in the gel particles continues to hydrolyze and effect further polymerization of the alumina whereby desirable pore characteristics are established. After a suitable aging period, usually from about 10 to about 24 hours at temperatures in the 50°–105° C. range, the alumina spheres are aged in a 2–4 wt. % aqueous ammonia solution, water-washed, dried and calcined. In any case, alumina spheres thus prepared and calcined at about 650° C. will typically adsorb and retain about 2.5 wt. % halogen when treated in contact with anhydrous, gaseous hydrogen chloride.

It is an object of this invention to provide a method of preparing alumina spheres of improved halogen capacity. In one of its broad aspects, the present invention embodies a method of catalyst manufacture which comprises commingling an aluminum hydroxyhalide sol characterized by an aluminum/acid anion weight ratio of from about 1.0 to about 1.5 with an ammonia precursor at below gelation temperature, said ammonia precursor being decomposable to ammonia with increasing temperature; dispersing the mixture as droplets in a hot oil bath at a temperature effecting decomposition of said ammonia precursor and gelation of said sol; aging the resulting spheres in the hot oil bath and effecting decomposition of the residual ammonia precursor contained therein; separating and further aging the spheres in an aqueous ammonium carbonate solution; and washing, drying and calcining the aged spheres.

One of the more specific embodiments of the present invention concerns a method of preparing alumina spheres of improved chlorine capacity which comprises commingling an aluminum hydroxychloride sol characterized by an aluminum/chloride weight ratio of from about 1.0 to about 1.5 with hexamethylenetetramine at below gelation temperature; dispersing the mixture as droplets in a hot oil bath at a temperature of from about 50° to about 105° C.; aging the resulting spheres in said hot oil bath at a temperature of from about 50° to about 105° C.; separating and further aging the spheres in an aqueous ammonium carbonate solution at a temperature of from about 20° to about 50° C.; and washing, drying and calcining the aged spheres at a temperature of from about 425° to about 750° C.

Other objects and embodiments of this invention will become apparent in the following detailed specification.

As heretofore mentioned, the present invention is particularly concerned with the preparation of alumina spheres by the oil drop method. While Hoekstra, in U.S. Pat. No. 2,620,314, teaches the preparation of alumina spheres from an alumina sol as herein contemplated, the Hoekstra reference does not provide a teaching of the present invention which embodies an ammonium carbonate aging of the spheroidal gel particles prior to high temperature calcination. In this manner, alumina spheres with a greater capacity for halogen are produced.

Thus, pursuant to the method of the present invention, an acidic alumina sol is dispersed as droplets in a hot oil bath, preferably maintained at a temperature of from about 50° to about 105° C., whereby gelation occurs with the formation of firm spherical gel particles. The acidic alumina sol is preferably an aluminum hydroxychloride sol suitably prepared by digesting aluminum turnings, slugs or pellets in aqueous hydrochloric acid and/or aluminum chloride solution. In this type of operation, the sol is set to a gel utilizing ammonia as a neutralizing or setting agent. The ammonia is derived from an ammonia precursor. The ammonia precursor is preferably hexamethylenetetramine although other weakly basic materials, including urea alone or in combination with hexamethylenetetramine, which are substantially stable at below gelation temperature but hydrolyzable to ammonia with increasing temperature, may be employed. The hexamethylenetetramine, or other ammonia precursor, is utilized in an amount sufficient to effect substantial complete neutralization of the chloride or other acidic anion contained in the sol upon total hydrolysis. Preferably, hexamethylenetetramine is utilized in an amount equivalent to from about a 1:4 to about a 2:4 mole ratio with said chloride. The hexamethylenetetramine is preferably separately prepared in an aqueous solution and thereafter commingled with the alumina sol. The hexamethylenetetramine aqueous solution suitably comprises from about 28 to about 48 wt. % hexamethylenetetramine.

Only a fraction of the ammonia precursor is hydrolyzed or decomposed to ammonia in the relatively short period during which initial gelation occurs. During the subsequent aging process, the residual ammonia precursor retained in the spherical gel particles continues to hydrolyze and effect further polymerization of the alumina whereby pore characteristics of the product are established. The spherical gel particles are aged, preferably in the alkaline oil bath, at a temperature of from about 50° to about 105° C. under atmospsheric pressure conditions. The spheroidal particles are suitably aged at the described conditions of temperature and pressure within a period of from about 1 to about 5 hours.

Pursuant to the present invention, the oil-aged spheres are further aged in an aqueous ammonium carbonate solution. The ammonium carbonate age is suitably effected at a temperature of from about 20° to about 50° C. over a period of from about 10 to about 24 hours or more. The ammonium carbonate concentration should be sufficient to provide from about 1 to about 10 moles, and preferably from about 2 to about 4 moles, per mole of halogen originally present in the aluminum hydroxyhalide sol.

After the aging treatment, the spheres are washed in any suitable manner. A particularly satisfactory method is to wash the spheres by percolation, either with an upward or downward flow of water, and preferably with water containing a small amount of ammonium hydroxide and/or ammonium nitrate. After washing, the spheres may be dried at a temperature of from about 95° to about 315° C. for 2 to 24 hours or more, or dried at this temperature and calcined at a temperature of from about 425° to about 750° C. for 2 to 12 hours or more, and utilized as such or composited with other catalytic components. It is preferred that the spheres be dried slowly and also that the drying be effected in a humid atmosphere since this has been found to result in less breakage of the spheres.

The described oil-drop method affords a convenient means of developing the desired density characteristics of the spherical gel product. Thus, the method includes a number of process variables which affect the physical properties of the spherical alumina particles. Generally, the aluminum/chloride ratio of the sol will influence the average bulk density of the particles and, correspondingly, the pore volume and pore diameter characteristics attendant therewith, higher ratios tending toward lower average densities. Low density alumina spheres of less than about 0.5 grams per cubic centimeter are produced with aluminum/chloride ratios of from about 1.0 to about 1.5. Other process variables affecting physical properties include the time, temperature and pH at which the particles are all aged. Surface properties are normally a function of calcination temperature.

The following examples are presented in illustration of the method of this invention and are not intended as an undue limitation on the generally broad scope of the invention as set out in the appended claims.

EXAMPLE I

Aluminum pellets were digested in a dilute hydrochloric acid at about 102° C. to obtain an alumina sol containing aluminum in from about a 1.15:1 weight ratio with the chloride anion content thereof. The sol was thereafter cooled to about 6° C. and admixed with a 28% aqueous hexamethylenetetramine solution to provide a sol containing about 12 wt. % hexamethylenetetramine and 8 wt. % alumina. The sol was formed into spheroidal gel particles by emitting the same as droplets into a gas oil suspending medium contained in a column at about 95° C. The spherical particles recovered from the bottom of the column were aged in a portion of the hot oil for about 16 hours.

One portion of the spheres was further treated in accordance with prior art practice, that is, aged for about 3 hours in 3% aqueous ammonia solution, water-washed, dried at about 400° C. in air, and calcined in air for about 2 hours at 650° C. to yield 1/16 inch alumina spheres. When treated in contact with a stream of gaseous, anhydrous hydrogen chloride, the spheres adsorbed approximately 2.5 wt. % chloride at equilibrium conditions.

EXAMPLE II

Another portion of the oil-aged spheres of Example I was further treated in accordance with the method of this invention. Thus, the oilaged spheres were further aged in an aqueous ammonium carbonate solution containing 0.273 grams of ammonium carbonate per milliliter. The ammonium carbonate age was effected at room temperature. Thereafter, the spheres were water-washed, dried and calcined at 650° C. as described in the previous example. When treated in contact with an anhydrous, gaseous hydrogen chloride stream at the same conditions as the spheres of Example I, the spheres adsorbed 4.3 wt. % chloride at equilibrium conditions.

I claim as my invention:

1. In the preparation of alumina spheres wherein an acidic alumina sol is dispersed as droplets in a hot oil bath in which the sol droplets are gelled and aged, the improvement of removing the aged spheres from the oil bath and then further aging the same in an aqueous ammonium carbonate solution at a temperature of from about 20° to about 50° C., and thereafter washing, drying and calcining the alumina spheres.

2. The method of claim 1 further characterized in that said alumina sol is commingled with hexamethylenetetramine.

3. The method of claim 2 further characterized in that said hexamethylenetetramine is utilized in an amount to effect substantially complete neutralization of said acidic alumina sol.

4. The method of claim 1 further characterized in that said oil bath is maintained at a temperature of from about 50° to about 105° C.

5. The method of claim 1 further characterized in that said spheres are oil aged at a temperature of from about 50° to about 105° C.

6. The method of claim 1 further characterized in that said spheres are calcined at a temperature of from about 425° to about 750° C.

* * * * *